US009110434B2

(12) United States Patent
Halfyard et al.

(10) Patent No.: US 9,110,434 B2
(45) Date of Patent: Aug. 18, 2015

(54) SYSTEM AND METHOD FOR PRE-TREATING MAGNETIC INK CHARACTER RECOGNITION READABLE DOCUMENTS

(75) Inventors: Kurt I. Halfyard, Mississauga (CA);
Christine D. Anderson, Hamilton (CN);
T. Brian McAneney, Burlington (CN);
Gordon Sisler, St Catharines (CN);
George A. Gibson, Fairport, NY (US)

(73) Assignee: Xerox Corporation, Norwalk, CT (US)

( * ) Notice: Subject to any disclaimer, the term of this patent is extended or adjusted under 35 U.S.C. 154(b) by 1821 days.

(21) Appl. No.: 11/985,675

(22) Filed: Nov. 16, 2007

(65) Prior Publication Data
US 2009/0130302 A1     May 21, 2009

(51) Int. Cl.
| B32B 15/00 | (2006.01) |
| G03G 21/04 | (2006.01) |
| B41M 5/00 | (2006.01) |
| G03G 15/22 | (2006.01) |
| B41M 3/00 | (2006.01) |
| B41M 5/382 | (2006.01) |
| B41M 7/00 | (2006.01) |

(52) U.S. Cl.
CPC ............ *G03G 21/043* (2013.01); *B41M 5/00* (2013.01); *G03G 15/22* (2013.01); *B32B 15/00* (2013.01); *B41M 3/008* (2013.01); *B41M 5/38285* (2013.01); *B41M 7/0027* (2013.01); *B41M 2205/12* (2013.01); *G03G 2215/0013* (2013.01); *G03G 2215/00021* (2013.01); *Y10T 428/24802* (2015.01)

(58) Field of Classification Search
USPC .............. 428/484.1, 195.1, 488.11, 900, 913, 428/914, 692.1, 693.1, 485, 486, 487
See application file for complete search history.

(56) References Cited

U.S. PATENT DOCUMENTS

| 3,293,650 | A | * | 12/1966 | Buros | 360/1 |
|---|---|---|---|---|---|
| 4,231,593 | A | | 11/1980 | Bell, Jr. et al. | 283/6 |
| 4,343,243 | A | | 8/1982 | Gentry et al. | 101/96 |
| 4,558,108 | A | | 12/1985 | Alexandru et al. | 526/340 |
| 4,634,148 | A | | 1/1987 | Greene | 283/70 |
| 4,688,050 | A | | 8/1987 | Tsao | 346/76 |
| 4,891,240 | A | | 1/1990 | Ward et al. | 427/11 |
| 4,901,114 | A | * | 2/1990 | Parker et al. | 399/232 |
| 5,084,359 | A | | 1/1992 | Talvalkar et al. | 428/484 |
| 5,089,350 | A | | 2/1992 | Talvalkar et al. | 428/484 |
| 5,135,569 | A | * | 8/1992 | Mathias | 106/31.32 |
| 5,456,498 | A | | 10/1995 | Greene | 283/70 |
| 5,514,467 | A | | 5/1996 | Berkes et al. | 428/329 |
| 5,525,572 | A | | 6/1996 | Williams | 503/201 |
| 5,554,480 | A | | 9/1996 | Patel et al. | 430/137 |
| 5,556,727 | A | | 9/1996 | Ciccarelli et al. | 430/45 |
| 5,639,708 | A | | 6/1997 | Golemo et al. | 503/205 |
| 5,759,734 | A | | 6/1998 | Malhotra | 430/124 |
| 5,843,579 | A | | 12/1998 | Roth et al. | 428/484 |
| 5,866,637 | A | | 2/1999 | Lorenz | 523/161 |
| 5,888,622 | A | | 3/1999 | Pinell et al. | 428/195 |
| 6,032,004 | A | | 2/2000 | Mirabella, Jr. et al. | 399/90 |

(Continued)

*Primary Examiner* — Holly Rickman
*Assistant Examiner* — Lisa Chau
(74) *Attorney, Agent, or Firm* — Alix, Yale & Ristas, LLP

(57) ABSTRACT

Disclosed herein is a printing system is described having a first printer including a fuser employing fuser oil, and a coater disposed upstream or downstream from the first printer and being configured to deposit a wax coating on a portion of the substrate. A corresponding method and a substrate also are described. The system, method and substrate are useful for preparing MICR encoded documents such as checks.

15 Claims, 3 Drawing Sheets

(56) References Cited

U.S. PATENT DOCUMENTS

| | | | |
|---|---|---|---|
| 6,155,604 A | 12/2000 | Greene et al. | 283/70 |
| 6,291,121 B1 | 9/2001 | Hollenbaugh, Jr. et al. | 430/108.7 |
| 6,306,510 B1 * | 10/2001 | Verlinden et al. | 428/426 |
| 6,326,119 B1 | 12/2001 | Hollenbaugh, Jr. et al. | 430/137.2 |
| 6,365,316 B1 | 4/2002 | Stamp et al. | 430/111.41 |
| 6,530,601 B2 | 3/2003 | Greene | 283/57 |
| 6,613,403 B2 | 9/2003 | Tan et al. | 428/29 |
| 6,673,500 B1 | 1/2004 | Patel et al. | 430/108.2 |
| 6,701,304 B2 | 3/2004 | Leon | 705/401 |
| 6,743,561 B2 | 6/2004 | Heeks et al. | 430/124 |
| 6,782,144 B2 | 8/2004 | Bellavita et al. | 382/310 |
| 6,824,942 B2 | 11/2004 | Silence et al. | 430/108.4 |
| 6,850,725 B2 | 2/2005 | Silence et al. | 399/297 |
| 6,970,246 B2 | 11/2005 | Hansen | 356/417 |
| 7,058,350 B2 | 6/2006 | Hsieh et al. | 399/380 |
| 2004/0137203 A1 | 7/2004 | Adams et al. | 428/195.1 |
| 2005/0048294 A1 * | 3/2005 | Kaplan et al. | 428/447 |
| 2005/0250038 A1 * | 11/2005 | McAneney et al. | 430/124 |
| 2005/0285918 A1 | 12/2005 | McElligott et al. | 347/101 |
| 2006/0118738 A1 | 6/2006 | Ross et al. | 250/556 |
| 2006/0118739 A1 | 6/2006 | Ross et al. | 250/556 |
| 2006/0186348 A1 | 8/2006 | Nguyen et al. | 250/484.4 |
| 2007/0095921 A1 | 5/2007 | Roth | 235/491 |
| 2007/0108392 A1 | 5/2007 | Ross | 250/458.1 |

* cited by examiner

SYSTEM AND METHOD FOR PRE-TREATING MAGNETIC INK CHARACTER RECOGNITION READABLE DOCUMENTS

BACKGROUND

The embodiments described herein generally relate to processing pre-printed documents and more particularly to a system and method for coating documents.

As explained in commonly assigned U.S. Patent Publication 2005/0285918 (the complete disclosure of which is incorporated herein by reference) inks suited for use in printing magnetic ink character recognition (MICR) readable documents are known. Such inks are generally employed in the printing and preparation of documents intended for automated processing, such as checks.

Of particular interest in this instance are those inks which contain a magnetic pigment or component in an amount sufficient to generate a magnetic signal that is strong enough to be MICR-readable. Such inks generally fall into the category of magnetic inks in general, and in the more specific subcategory of MICR-readable inks. Generally, the ink is used to print a portion of a document, such as a check, bond, security card, etc. containing an identification code area, which is intended for automated processing. The characters of this identification code are usually MICR encoded. The document may be printed with a combination of MICR-readable ink and non-MICR-readable ink, or with just MICR-readable ink. The document thus printed is then exposed to an appropriate source or field of magnetization, at which time the magnetic particles become aligned as they accept and retain a magnetic signal. The identification code on the document can then be recognized by passing it through a reader device that detects or reads the magnetic signal of the MICR imprinted characters in order to recognize the coding printed on the document.

Of particular importance in the foregoing is the ability of the printed characters to adhere to the sheet and thus retain their readable characteristic such that they are easily detected by the detection device or reader. The magnetic charge, known as "remanence," also must be retained by the pigment or magnetic component.

In some situations, magnetic thermal transfer ribbon printing mechanisms are used to generate MICR-readable characters or indicia. In this printing technique, the magnetic component is retained on a ribbon substrate by a binder and/or wax material. Then, upon application of heat and pressure, the magnetic component is transferred to a substrate. Other details regarding thermal ribbon printing technology are discussed in detail in U.S. Patent Publication 2004/0137203, the entire contents of which are also incorporated herein by reference.

U.S. Pat. No. 5,888,622 discloses a coated cellulosic web product and a coating composition that provides enhanced toner adhesion for documents printed using noncontact printing devices such as ion deposition printers. U.S. Pat. No. 4,231,593 discloses a bank check with at least two coatings, one of which is electrically conductive, and the other which is electrically non-conductive. In some cases, a MICR ink is applied as an additional coating.

It would be useful to develop a method of conditioning documents having fuser oil on the surface to receive and retain MICR encoded inks.

SUMMARY

One embodiment is a printing system comprising a first printer configured to print a first set of data on a substrate, the first printer including a fuser employing fuser oil, and a coater disposed upstream or downstream from the first printer. The coater is configured to deposit a fuser oil-mitigating wax coating on a portion of the substrate.

Another embodiment is a method comprising coating a portion of a document surface with a fuser oil-mitigating wax to form a coated portion, performing a printing process on the document to produce a pre-printed document, the printing process resulting in the presence of fuser oil on the surface of the document, and applying a magnetic image to the coated portion using a magnetic ink character recognition encoding process.

Yet another embodiment is a substrate comprising a first surface having fuser oil thereon, a portion of the first surface including a wax coating having a plurality of cracks therein, and a magnetic ink image having a magnetic signal strength of at least 80% formed over the wax coating.

DETAILED DESCRIPTION

Figure 1:
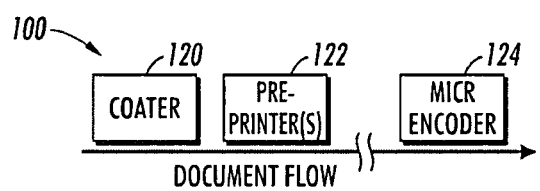
FIG. 1 is a schematic drawing of a system and method used with embodiments herein.

A system and method for coating a portion of a document prior to printing of images in MICR ink are described herein. The coating process improves the adhesion and/or magnetic signal strength of the MICR image printed on a portion of a document that has fuser oil thereon. Typically, the fuser oil is residual oil remaining on the document after a printing process involving a fusing step has been completed. In embodiments, the MICR encoding produces documents with a reader rejection rate that is substantially lower than that resulting from MICR printing on uncoated documents having fuser oil thereon.

As used herein, a "pre-printed document" is a document that has primary MICR encoded or non-MICR encoded images printed thereon. A "wax emulsion" is a dispersion of a wax in a continuous liquid phase. The wax is held in suspension by an emulsifier. "Magnetic signal strength" as used herein refers to the strength of a magnetic signal from a MICR ink deposited on a document. As used herein, a "document" is media having an image printed thereon. The term "receive and retain a magnetic image" as used herein refers to the ability of the wax coating to impart sufficient adhesion to a subsequently applied MICR image that the MICR image has a magnetic signal strength of at least 80%. The phrase "mitigate fuser oil" as used herein refers to a lessening of the negative impact that fuser oil has on adhesion and resulting magnetic signal strength of a MICR image. As used herein, the term "fuser oil-mitigating wax" refers to a wax that lessens the negative impact that fuser oil has on adhesion and resulting signal strength of a MICR image. The term "printer" as used herein encompasses any apparatus, such as a digital copier, bookmaking machine, facsimile machine, multi-function machine, etc. that performs a print outputting function for any purpose.

On negotiable pre-printed documents such as checks and other negotiable instruments, the MICR amount field often is encoded as part of the bank's "proof of deposit" operation. One popular device for encoding MICR amounts uses magnetic thermal transfer ribbon print technology. Thermal ribbon readability in MICR reader/sorters can be degraded by prior application of some fuser oils (release agents) used when originally printing the check or pre-printed document. While mercapto-functional release agents usually have minimal impact on readability rates, those containing amino-functional groups are found to degrade the readability of the encoded data. Embodiments herein present a methodology for eliminating the negative impact of amino-functional group release agents on encoders, including but not limited to magnetic thermal transfer ribbon (MTTR) and impact transfer ribbon MICR encoders, allowing development of MICR products on xerographic platforms, including those that use amino-functional group release agents.

Xerox DocuTech® and other machines can be used to print checks, and in embodiments, MICR encoding checks. The process allows for basic check writing abilities, but does not provide the flexibility to use color or allow for personalization of checks. In some machines, such as the DocuTech® family of machines, the background and initial MICR encoding is all performed on one machine. Fuser oils such mercapto, amino and other functionalized PDMS fuser oils, non-functionalized PDMS oils, and mixtures thereof, are used in such machines. The fuser oils are used to strip the sheets from the fuser members. Further, secondary MICR encoding is performed at the "bank of first deposit" where the MICR imprinting is placed over the fused check. When the completed check is placed through the check reader/sorter, the reject rate usually should be at or below 0.5%.

The coating of a wax emulsion on a portion of a document containing fuser oil mitigates the negative impact of the fuser oil. The coating of a wax emulsion on a portion of the document that is subsequently contacted with fuser oil also serves to mitigate the fuser oil due to the good adhesion between the wax and the binding layer of a transfer ribbon. It has been found that the presence of small cracks in the wax coating does not deter from the mitigating properties of the wax coating. It is believed that the cracks may allow for absorption of the fuser oil into the paper.

The wax coating can be used on both coated and uncoated paper on a wide range of paper stock. Typical fuser oils that can be coated with the wax include non-functionalized and functionalized PDMS fuser oils, such as amino functionalized PDMS, and mixtures containing amino functionalized fuser oils along with other fuser oils. The oil rate per copy ranges from about 1 to about 20 microlitres per copy or 0.002-0.035 $\mu L/cm^2$.

The resulting magnetic signal strength of an encoded image applied over the wax coating is at least 80%, and sometimes is at least 95% and in certain cases is over 100%. Magnetic signal strength of a magnetic image can be measured by using known devices, including the MICR-Mate 1, manufactured by Checkmate Electronics, Inc.

In one embodiment the method is used to provide secondary MICR encoding on a document that has first been processed with a monochrome xerographic printer, and in particular a high-speed xerographic printer, using a first MICR toner for primary MICR encoding followed by a high-speed xerographic printing machine using non-MICR toner. In embodiments, the MICR toner used for primary encoding usually is black and the non-MICR xerographic toner can be black or color, and in embodiments is color. The xerographic MICR printer and non-MICR xerographic print engine may be separate machines, which are either loosely or tightly coupled. The document often, but not necessarily, is then sent to a different location for the secondary encoding process.

MICR Toner Compositions

The MICR toner compositions selected herein may comprise resin particles, magnetites, and optional colorant, such as pigment, dyes, carbon blacks, and waxes such as polyethylene and polypropylene. The toners can further include a second resin, a colorant or colorants, a charge additive, a flow additive, reuse or recycled toner fines, and other ingredients. A carrier optionally can be included. Also, there can be blended at least one surface additive with the ground and classified melt mixed toner product. Toner particles in embodiments can have a volume average diameter particle size of about 6 to about 25, or from about 6 to about 14 microns.

Resin

Illustrative examples of resins suitable for MICR toner and MICR developer compositions herein include linear or branched styrene acrylates, styrene methacrylates, styrene butadienes, vinyl resins, including linear or branched homopolymers and copolymers of two or more vinyl monomers; vinyl monomers include styrene, p-chlorostyrene, butadiene, isoprene, and myrcene; vinyl esters like esters of monocarboxylic acids including methyl acrylate, ethyl acrylate, n-butyl acrylate, isobutyl acrylate, dodecyl acrylate, n-octyl acrylate, phenyl acrylate, methyl methacrylate, ethyl methacrylate, and butyl methacrylate; acrylonitrile, methacrylonitrile, acrylamide; and the like. A specific example includes styrene butadiene copolymers, mixtures thereof, and the like, and also styrene/n-butyl acrylate copolymers, PLIOLITES®; suspension polymerized styrene butadienes, reference U.S. Pat. No. 4,558,108, the disclosure of which is totally incorporated herein by reference.

Magnetite

Various forms of iron oxide can be used as the magnetite. Magnetites can include a mixture of iron oxides (for example, $FeO.Fe_2O_3$) and carbon.black, including those commercially available as MAPICO BLACK®. Mixtures of magnetites can be present in the toner composition in an amount of from about 10 to about 70 percent by weight, or from about 10 percent by weight to about 50 percent by weight. Mixtures of carbon black and magnetite with from about 1 to about 15 weight percent of carbon black, or from about 2 to about 6 weight percent of carbon black, and magnetite, in an amount of, for example, from about 5 to about 60, or from about 10 to about 50 weight percent, can be selected.

Wax

Illustrative examples of aliphatic hydrocarbon waxes include low molecular weight polyethylene and polypropylene waxes with a weight average molecular weight of, for example, about 500 to about 5,000. Also, there are included in the toner compositions low molecular weight waxes, such as polypropylenes and polyethylenes commercially available from Allied Chemical and Petrolite Corporation, EPOLENE N-15® commercially available from Eastman Chemical Products, Inc., VISCOL 550-P®, a low weight average molecular weight polypropylene available from Sanyo Kasei K.K., and similar materials. The commercially available polyethylenes selected have a molecular weight of from about 1,000 to about 1,500, while the commercially available polypropylenes used for the toner compositions are believed to have a molecular weight of from about 4,000 to about 5,000. The wax can be present in the toner in an amount of from about 4 to about 7 weight percent.

Optional Carrier

Illustrative examples of carrier particles include iron powder, steel, nickel, iron, ferrites, including copper zinc ferrites, and the like. The carrier can be coated with a costing such as terpolymers of styrene, methylmethacrylate, and a silane, such as triethoxy silane, including for example KYNAR® and polymethylmethacrylate mixtures (40/60). Coating weights can vary as indicated herein. However, the weights can be from about 0.3 to about 2, or from about 0.5 to about 1.5 weight percent coating weight.

The printing process can be employed with either or both single component (SCD) and two-component development systems. Toners useful in MICR printing include mono-component and dual-component toners. Toners for MICR include those having a binder and at least one magnetic material. Optionally, the toner may include a surface treatment such as a charge control agent, or flowability improving agents, a release agent such as a wax, colorants and other additives.

Non-MICR Toners

Suitable non-MICR toners for use for printed images on a document that also contains MICR encoding are disclosed in, for example, U.S. Pat. Nos. 6,326,119; 6,365,316; 6,824,942 and 6,850,725, the disclosures thereof are hereby incorporated by reference in their entirety. In embodiments, the non-MICR toner can be black or color, and in embodiments, is color non-MICR xerographic toner.

The non-MICR toner resin can be a partially crosslinked unsaturated resin such as unsaturated polyester prepared by crosslinking a linear unsaturated resin (hereinafter called base resin), such as linear unsaturated polyester resin, in embodiments, with a chemical initiator, in a melt mixing device such as, for example, an extruder at high temperature (e.g., above the melting temperature of the resin, and more specifically, up to about 150° C. above that melting temperature) and under high shear. Also, the toner resin possesses, for example, a weight fraction of the microgel (gel content) in the resin mixture of from about 0.001 to about 50 weight percent, from about 1 to about 20 weight percent, or about 1 to about 10 weight percent, or from about 2 to about 9 weight percent. The linear portion is comprised of base resin, more specifically unsaturated polyester, in the range of from about 50 to about 99.999 percent by weight of the toner resin, or from about 80 to about 98 percent by weight of the toner resin. The linear portion of the resin may comprise low molecular weight reactive base resin that did not crosslink during the crosslinking reaction, more specifically unsaturated polyester resin.

The molecular weight distribution of the resin is thus bimodal having different ranges for the linear and the crosslinked portions of the binder. The number average molecular weight ($M_n$) of the linear portion as measured by gel permeation chromatography (GPC) is from, for example, about 1,000 to about 20,000, or from about 3,000 to about 8,000. The weight average molecular weight ($M_w$) of the linear portion is from, for example, about 2,000 to about 40,000, or from about 5,000 to about 20,000. The weight average molecular weight of the gel portions is greater than 1,000,000. The molecular weight distribution ($M_w/M_n$) of the linear portion is from about 1.5 to about 6, or from about 1.8 to about 4. The onset glass transition temperature (Tg) of the linear portion as measured by differential scanning calorimetry (DSC) is from about 50° C. to about 70° C.

Moreover, the binder resin, especially the crosslinked polyesters, can provide a low melt toner with a minimum fix temperature of from about 100° C. to about 200° C., or from about 100° C. to about 160° C., or from about 110° C. to about 140° C.; provide the low melt toner with a wide fusing latitude to minimize or prevent offset of the toner onto the fuser roll; and maintain high toner pulverization efficiencies. The toner resins and thus toners, show minimized or substantially no vinyl or document offset.

Examples of unsaturated polyester base resins are prepared from diacids and/or anhydrides such as, for example, maleic anhydride, fumaric acid, and the like, and mixtures thereof, and diols such as, for example, propoxylated bisphenol A, propylene glycol, and the like, and mixtures thereof. An example of a suitable polyester is poly(propoxylated bisphenol A fumarate).

In embodiments, the toner binder resin is generated by the melt extrusion of (a) linear propoxylated bisphenol A fumarate resin, and (b) crosslinked by reactive extrusion of the linear resin with the resulting extrudate comprising a resin with an overall gel content of from about 2 to about 9 weight percent. Linear propoxylated bisphenol A fumarate resin is available under the trade name SPAR II™ from Resana S/A Industrias Quimicas, Sao Paulo Brazil, or as NEOXYL P2294™ or P2297™ from DSM Polymer, Geleen, The Netherlands, for example. For suitable toner storage and prevention of vinyl and document offset, the polyester resin blend more specifically has a Tg range of from, for example, about 52° C. to about 64° C.

Chemical initiators, such as, for example, organic peroxides or azo-compounds, can be used for the preparation of the crosslinked toner resins.

The low melt toners and toner resins may be prepared by a reactive melt mixing process wherein reactive resins are partially crosslinked. For example, low melt toner resins may be fabricated by a reactive melt mixing process comprising (1) melting reactive base resin, thereby forming a polymer melt, in a melt mixing device; (2) initiating crosslinking of the polymer melt, more specifically with a chemical crosslinking initiator and increased reaction temperature; (3) retaining the polymer melt in the melt mixing device for a sufficient residence time that partial crosslinking of the base resin may be achieved; (4) providing sufficiently high shear during the crosslinking reaction to keep the gel particles formed and broken down during shearing and mixing, and well distributed in the polymer melt; (5) optionally devolatilizing the polymer melt to remove any effluent volatiles; and (6) optionally adding additional linear base resin after the crosslinking in order to achieve the desired level of gel content in the end resin. The high temperature reactive melt mixing process allows for very fast crosslinking which enables the production of substantially only microgel particles, and the high shear of the process prevents undue growth of the microgels and enables the microgel particles to be uniformly distributed in the resin.

A reactive melt mixing process is, for example, a process wherein chemical reactions can be affected on the polymer in the melt phase in a melt-mixing device, such as an extruder. In preparing the toner resins, these reactions are used to modify the chemical structure and the molecular weight, and thus the melt rheology and fusing properties of the polymer. Reactive melt mixing is particularly efficient for highly viscous materials, and is advantageous because it requires no solvents, and thus is easily environmentally controlled. As the amount of crosslinking desired is achieved, the reaction products can be quickly removed from the reaction chamber.

The resin is present in the non-MICR toner in an amount of from about 40 to about 98 percent by weight, or from about 70 to about 98 percent by weight. The resin can be melt blended or mixed with a colorant, charge carrier additives, surfactants, emulsifiers, pigment dispersants, flow additives, embrittling agents, and the like. The resultant product can then be pulverized by known methods, such as milling, to form the desired toner particles.

Waxes with, for example, a low molecular weight $M_w$ of from about 1,000 to about 10,000, such as polyethylene, polypropylene, and paraffin waxes, can be included in, or on the non-MICR toner compositions as, for example, fusing release agents. It is noted that the coating would not typically be applied over the non-MICR toners because it is applied to areas of the check that are to contain encoded data.

Various suitable colorants of any color can be present in the non-MICR toners, including suitable colored pigments, dyes, and mixtures thereof including REGAL 330®; (Cabot), Acetylene Black, Lamp Black, Aniline Black; magnetites, such as Mobay magnetites MO8029™, MO8060™; Columbian magnetites; MAPICO BLACKS™ and surface treated magnetites; Pfizer magnetites CB4799™, CB5300™, CB5600™, MCX6369™; Bayer magnetites, BAYFERROX 8600™, 8610™; Northern Pigments magnetites, NP-604™, NP-608™; Magnox magnetites TMB-100™, or TMB-104™; and the like; cyan, magenta, yellow, red, green, brown, blue or mixtures thereof, such as specific phthalocyanine HELIOGEN BLUE L690™, D6840™, D7080™, D7020™, PYLAM OIL BLUE™, PYLAM OIL YELLOW™, PIGMENT BLUE 1™ available from Paul Uhlich & Company, Inc., PIGMENT VIOLET 1™, PIGMENT RED 48™, LEMON CHROME YELLOW DCC 1026™, E.D. TOLUIDINE RED™ and BON RED C™ available from Dominion Color Corporation, Ltd., Toronto, Ontario, NOVAPERM YELLOW FGL™, HOSTAPERM PINK E™ from Hoechst, and CINQUASIA MAGENTA™ available from E.I. DuPont de Nemours & Company, and the like. Generally, colored pigments and dyes that can be selected are cyan, magenta, or yellow pigments or dyes, and mixtures thereof. Examples of magentas that may be selected include, for example, 2,9-dimethyl-substituted quinacridone and anthraquinone dye identified in the Color Index as CI 60710, CI Dispersed Red 15, diazo dye identified in the Color Index as CI 26050, CI Solvent Red 19, and the like. Other colorants are magenta colorants of (Pigment Red) PR81:2, CI 45160:3. Illustrative examples of cyans that may be selected include copper tetra (octadecyl sulfonamido) phthalocyanine, x-copper phthalocyanine pigment listed in the Color Index as CI 74160, CI Pigment Blue, and Anthrathrene Blue, identified in the Color Index as CI 69810, Special Blue X-2137, and the like; while illustrative examples of yellows that may be selected are diarylide yellow 3,3-dichlorobenzidene acetoacetanilides, a monoazo pigment identified in the Color Index as CI 12700, CI Solvent Yellow 16, a nitrophenyl amine sulfonamide identified in the Color Index as Forum Yellow SE/GLN, CI Dispersed Yellow 33 2,5-dimethoxy-4-sulfonanilide phenylazo-4'-chloro-2,5-dimethoxy acetoacetanilides, and Permanent Yellow FGL, PY17, CI 21105, and known suitable dyes, such as red, blue, green, Pigment Blue 15:3 C.I. 74160, Pigment Red 81:3 C.I. 45160:3, and Pigment Yellow 17 C.I. 21105, and the like, reference for example U.S. Pat. No. 5,556,727, the disclosure of which is totally incorporated herein by reference.

The colorant, more specifically black, cyan, magenta and/or yellow colorant, is incorporated in an amount sufficient to impart the desired color to the toner. In general, pigment or dye is selected, for example, in an amount of from about 2 to about 60 percent by weight for color toner, and from about 2 to about 9 percent by weight for color toner, and about 3 to about 60 percent by weight for black toner.

The non-MICR toner composition can be prepared by a number of known methods including melt blending the toner resin particles, and pigment particles or colorants, followed by mechanical attrition. Other methods include those well known in the art such as spray drying, melt dispersion, dispersion polymerization, suspension polymerization, extrusion, and emulsion/aggregation processes.

The resulting non-MICR toner particles can then be formulated into a developer composition. The toner particles can be mixed with carrier particles to achieve a two-component developer composition.

Wax Coating

In embodiments, the wax coating is selectively placed on the portion of the document that is to receive secondary MICR encoding. The wax coating is applied before the fusing step or after the fusing step. When two or more fusers are coupled, the wax coating can go on before both fusing processes, after both fusing processes, or between the two fusing processes. When the wax is applied to the surface of a document prepared by the processes described herein, the magnetic signal strength of the resulting MICR encoded image is comparable to or better than that of a document having no fuser oil thereon.

After the wax coating is applied, it is dried. Drying can be accomplished by use of ambient air with or without the addition of minimal heat, for example, heating to from about 20 to about 90° C., or from about 25 to about 45° C., or from about 30 to about 38° C.

Suitable wax based coatings comprise aqueous wax emulsions, including but not limited to polyolefins and in particular aqueous polyethylene wax emulsions. In embodiments, the polyethylene wax has a melting point of from about 100 to about 150° C., or from about 125 to about 135° C. In embodiments, the aqueous polyethylene wax emulsion has a viscosity of from about 1 to about 100 centipoise, or from about 5 to about 50 centipoise, or from about 10 to about 20 centipoise. In embodiments, the aqueous polyethylene wax emulsion has a pH of from about 9.0 to about 10.5, or from about 9.2 to about 9.8, or about 9.6. In embodiments, the aqueous polyethylene wax emulsion has a solids content of from about 20 to about 40, or from about 26 to about 34 percent by weight. Particle size of the polyethylene wax may range from 0.05 to 0.1 micron. In certain embodiments, the water content of the aqueous polyethylene emulsion ranges from 55 to 75%. In some cases, an alcohol likely can be used in addition to water or in place of water for the continuous phase of the emulsion.

Non-limiting examples of suitable polyethylene waxes include JONCRYL WAX 26, JONCRYL WAX 28. JONCRYL WAX 26 is a polyethylene wax from Johnson Polymer/BASF having a melting point of about 130° C., a particle size of from about 50 to about 100 nm, a loading of about 26 percent solids, a density of about 8.2 lbs/gal, a viscosity of about 10 centipoise, and a pH of about 9.8. The wax is a light translucent emulsion in water. JONCRYL WAX 28 is a polyethylene wax from Johnson Polymer/BASF and having a melting point of about 132° C., particle size of from about 80 to about 100 nm, a loading of about 34 percent solids, a density of about 8.3 lbs/gal, a viscosity of about 50 centipoise, and a pH of about 9.2. Other suitable waxes that are commercially available include Baker Petrolite Synthetic Polywax 725 and Baker Petrolite Synthetic Polywax 655.

In some cases, the wax is present in the wet coating in an amount of about 20 to about 60 percent by weight. Suitable surfactants which may be present include Surfynol 504 (from Air Products), which includes a mixture of butanedioic acid, 1,4-bis(2-ethylhexyl) ester, sodium salt; NOVEC FC4432 (from 3M), which includes perfluorobutane sulfonates; and the like surfactants, and mixtures thereof. The surfactant may be present in the wax coating in an amount of from about 0.1 to about 5 percent, or from about 0.5 to about 1 percent by weight. A surfactant is a surface-active agent that accumulates at the interface between 2 liquids and modifies their surface properties. Additives such as a UV fluorescing tag also can be included. The coating can comprise a polyethylene having —OH bonding sites configured to bond with amino functional groups of the fuser oil.

Viscosity modifiers may also be present and include those which are alkali swellable, such as Acrysol ASE-60 (from Rohm & Haas), and associative thickeners such as Rheolate 255 (available from Elementis), and mixtures thereof. Humectants including but not limited to diethylene glycol can be added to the formulation to prevent spray nozzle clogging. Further details of suitable wax coatings are provide in commonly assigned U.S. patent application Ser. No. 11/523,283 filed Sep. 18, 2006, the contents of which are incorporated herein by reference in their entirety.

The wax coating typically has a surface tension of from about 10 to about 50, or from about 22 to about 34 mN/metre. This surface tension may be adjusted to closely match that of the document to ensure complete wetting of the document.

The coating can be applied to the document by known coating methods. As non-limiting examples, the coating can be air sprayed, hydraulically sprayed, gravure coated or ultrasonically jetted. In certain instances, the coating is applied to a thickness of from about 1 to about 10, or from about 1 to about 5 microns wet. In some cases, the dried coating has a thickness of about 0.5 microns to about 5 microns after drying. The document can be dried using known methods including air drying, ultraviolet drying, heat drying, and the like.

After the coating is placed on the document and dried, printing and fusing with fuser oil take place, as well as encoding using a magnetic thermal transfer ribbon. Any suitable encoder can be used to supply the MICR encoding. As a non-limiting example, an NCR 7766-100 encoder, available from NCR Corporation, can be used. This device employs magnetic thermal transfer ribbon, which places the ink from the ribbon onto the dried coating. An encoder using an impact transfer ribbon also can be used.

MICR Ink Compositions for Transfer Ribbon Printing

The MICR ink compositions selected herein for use in secondary MICR encoding using a transfer ribbon process typically comprise a dried film supported on a ribbon. The film includes magnetic material, which usually is a particulate material, a binder, a colorant (if needed in additional to the magnetic material), and other optional additives, including a release agent, such as an oil or wax component. Non-limiting examples of waxes include carnauba wax and low molecular weight polyethylene. The magnetic material can be an organic molecule-based magnetite and/or an inorganic magnetite. The binder is usually one or more thermoplastic resins used in coating formulations. Multiple resins can be combined to provide the desired property profiles. The colorant typically is pigments, dyes and/or carbon black. The ribbon typically has a thickness of about 5 microns, the binder layer has a thickness of about 25 microns and the ink/wax layer has a thickness of about 5 microns. Solvents are often used in preparing the ink-containing ribbon. Additional description of certain MICR inks that can be applied using a thermal transfer ribbon can be found in U.S. Pat. No. 5,866,637 assigned to NCR Corp., the contents of which are incorporated by reference herein in their entirety.

As indicated above, the aqueous wax emulsion creates a film which enables adhesion of the MICR ink from a Magnetic Thermal Transfer Ribbon and therefore leaves a surface on which further MICR imprinting can be carried out with a rejection rate which is greatly improved over oil-coated prints that do not include the wax coating. Typically, when the document is a check, a narrow area of the check is coated, e.g. a 0.5-5 cm wide portion across the long edge of the check (the MICR encoding line). In embodiments, the system can be incorporated in-line with a non-MICR printer, before the fusing step. This technique facilitates the mitigation of oil which contaminates the surface of the substrate after the fusing step.

Paper cockle is a condition in which bumps or ridges are formed on a printed sheet of paper, resulting in a wavy appearance. Coating only a small area along the document MICR line minimizes paper cockle as compared to covering the entire document surface. With curl, the edges of the paper move towards the center of the paper, sometimes forming a curled tube. To measure curl, one measures the height of each corner of a sheet of paper that is lying on a flat surface. The presence of cockle often reduces the degree of curl.

Referring now to FIG. 1, a system and corresponding method of encoding data on pre-printed forms is presented and is designated as 100. A document moves as shown by the document flow arrow of FIG. 1. A coater 120 applies a wax coating to at least the area of the document to be subsequently encoded, and a printer 122 pre-prints the document in a process that employs fuser oil. Then, a MICR encoder 124, which can be at the same location or a different location than the spray coater, adds the MICR encoded data to the document. In some cases, the document is subjected to a finishing process, such as lamination or binding, after coating and before MICR encoding.

The inclusion of the wax coating results in the subsequently MICR encoded image having sufficient magnetic signal strength that the image can be accurately read electronically. Thus, the disclosed method can record the processed data in the coated portion using a MICR encoder without encountering problems with the amino-functional group release agents.

Figure 2:
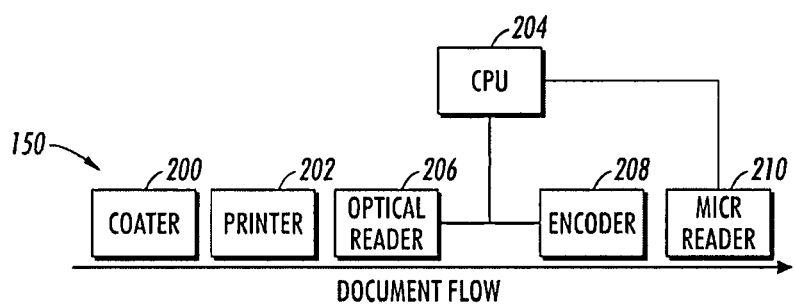
FIG. 2 is a schematic drawing of another system and method described herein.

Another system and corresponding method for coating, printing, scanning, and encoding is shown in FIG. 2 and is designated as 150. More specifically, FIG. 2 illustrates a coater 200, a printer 202, a reader 206, a central processing unit (CPU) 204, an encoder 208, and a second (MICR) reader 210. The readers 206, 210, CPU 204, and encoder 208 are standard commercially available items and are well-known to those ordinarily skilled in the art. Therefore, a detailed discussion of the same is omitted herefrom.

A document moves as shown by the document flow arrow into FIG. 2, and after coater with the coater 200, the document is pre-printed by the printer 202. The data to be read and subsequently encoded is added to the document at any time before it is encoded by the encoder 208. Data to be encoded is then read by the optical reader 206. In the optical reader 206, a device reads (e.g., scans) data that was previously recorded in the preprinted document and processes the scanned data in, for example, an optical character recognition (OCR) process (see U.S. Pat. No. 6,782,144, the complete disclosure of which is incorporated herein by reference, for a description of OCR and scanning systems). The read data is encoded at 208. The optional second reader 210 can be used to verify the encoding process.

The central processing unit 204 performs the necessary processing, such as optical character recognition (OCR), and instructs the encoder 208 to encode the MICR data on the document as the document passes by the encoder 208. For example, the method can read data that was hand written or machine printed by the user in a blank preprinted form. For example, the method can read monetary amounts hand written or printed in blanks of pre-printed documents.

As indicated above, one useful coating technique is spray coating. Non-limiting examples of suitable spray techniques include an air propelled brush, an air atomized spray device, a hydraulic spray device, or an ultrasonic spray device. Material could also be applied via piezo ink-jet or similar technology. In embodiments, the air brush dispenses a wet mass per area of about 0.1 to about 10 mg/cm2 of emulsion, or about 0.1 to about 5 mg/cm2, or about 2.0 to about 4.5 mg/cm2. The applicator is activated as the document passes under the nozzle (a fixed distance) at the process speed of the printing line to which the spray step is added. If the region to be sprayed is narrow, the spray nozzle can be turned at an angle or a mask can be used to cover portions of the document that do not need to be coated. When a dual action air brush is used, the wet mass per area of spray typically is about 0.1 to about 10 mg/cm$^2$ of emulsion, or about 0.1 to about 5 mg/cm$^2$, or about 2.0 to about 4.5 mg/cm$^2$.

In the systems and methods shown in FIGS. 1 and 2, the coating provides the subsequently MICR encoded image with sufficient adhesion and magnetic signal strength that the MICR image can be accurately read electronically. Thus, the disclosed method can record the processed data on the coated portion of the document using a MICR encoder in item 208 without encountering problems with fuser oils such that those containing amino-functional group release agents.

The following Examples are intended to illustrate and not limit the scope herein.

EXAMPLE 1

Xerox check stock 4024 DP, 24# (green perforated letter check stock) and 12-up personal check stock were spray coated by dual action air brush which dispensed a wet mass per area of about 0.005 g/cm2 of emulsion. The applicator was manually activated as the document passed under the nozzle (a fixed distance) at process speed of the printing line to which the spray step was added. The coating was applied along the MICR secondary encoding line with a wax composition having the formulation shown below.

Formulation 1: 2.5 wt % Acrysol ASE-60 (Rohm & Haas), a proprietary alkali swellable, crosslinked, acrylic thickener;
  95.5 wt % Jonwax 26 (BASF Johnson Polymer), a proprietary polyethylene wax emulsion having about 20-30% solids in water; and
  2.0 wt % IFWB-C2 (Risk Reactor, Huntington Beach, Calif.)), a UV tracer dye.

Figure 3:
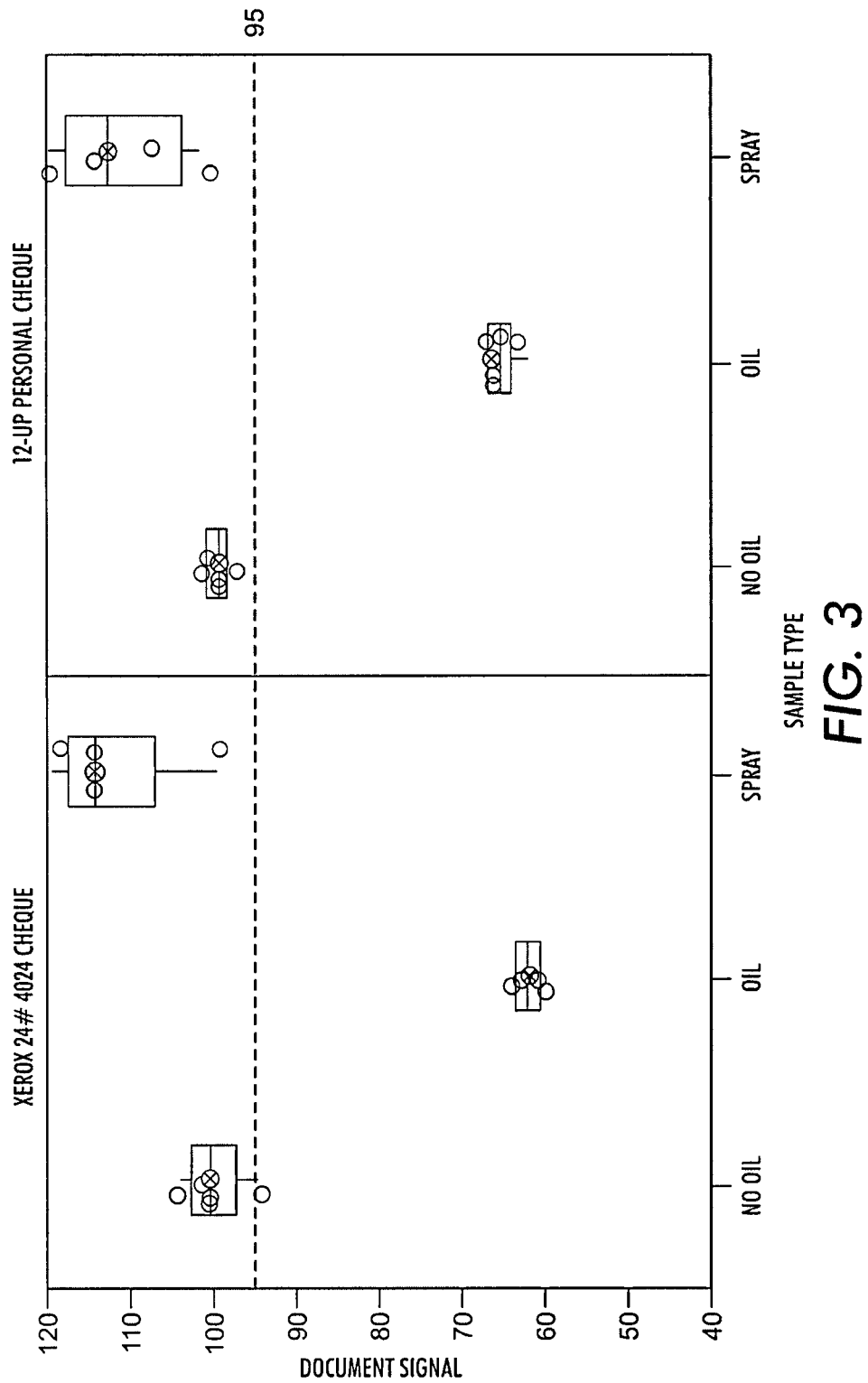
FIG. 3 is a box plot of magnetic signal strength and shows the relative magnetic signal strengths of a check that has no fuser oil present as compared to (a) MICR encoded checks that have fuser oil but no wax coating and (b) checks that have fuser oil and are pre-coated with a wax material on the portion that is MICR encoded.

The coated and dried check stock was run through an iGen3 fusing subsystem to coat the paper stock with a representative amount of amino functionalized fuser oil, about 8-14 microliters of oil per copy. After coating and drying, encoding took place. Encoding was performed using a NCR 7766-100 encoder (NCR Corp.) with a magnetic thermal transfer ribbon (MTTR) which placed the MICR ink on the dried wax emulsion. After encoding, testing of the completely finished check stock was conducted by measuring the magnetic signal strength of the encoding by running the check stock through a MICR Qualifier GTX (RDM Corp.). The results are shown on FIG. 3. Acceptable levels of magnetic signal strength were found for all runs in which the Xerox check stock 4024 DP, 24# and the 12-up personal check stock had a wax coating deposited in the MICR encoding area prior to the introduction of fuser oil to the documents.

Figure 4A:
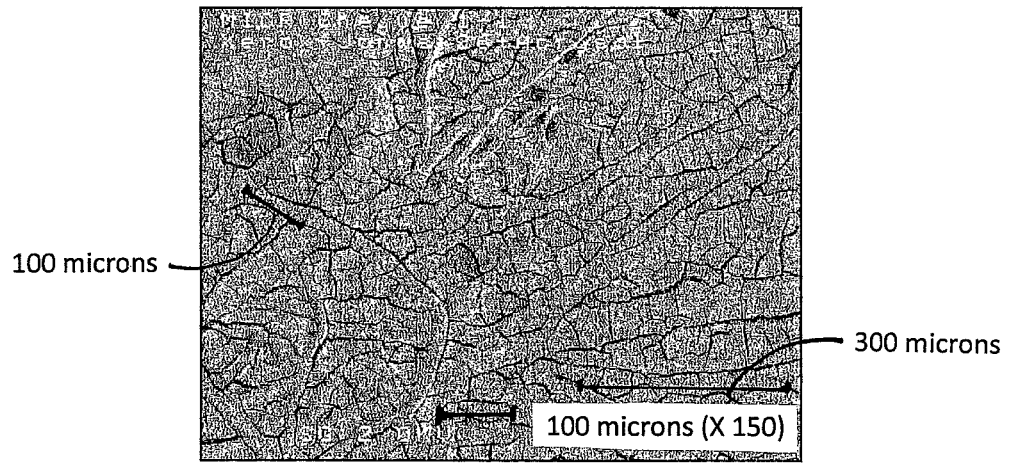
FIGS. 4A and 4B are micrographs showing a wax coating on a paper check surface, with FIG. 4A showing a magnification of 150× and FIG. 4B showing a magnification of 1500×.
Figure 4B:
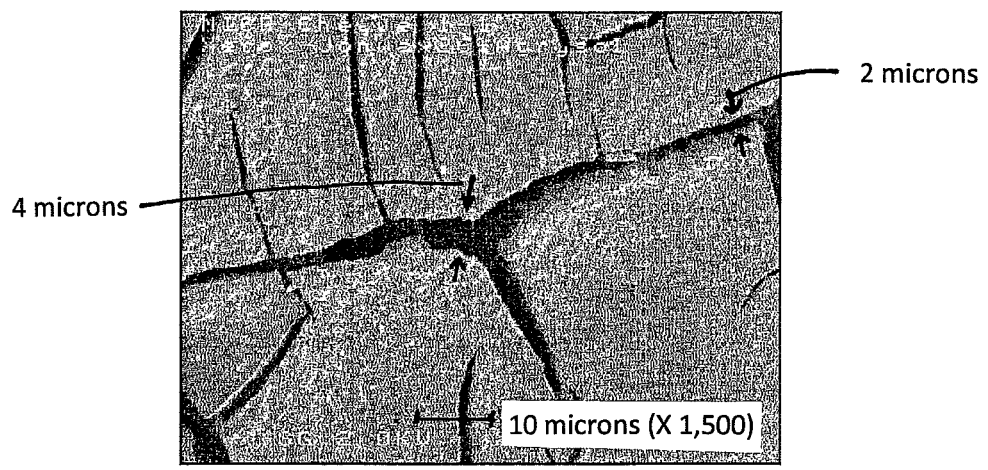

Generally speaking, a check which does not contain any oil (mercapto or otherwise) will produce a magnetic signal strength of approximately 98%±2%. However, when covered with a 0.09% (current iGen3) amino functionalized fuser oil, the magnetic signal strength decreases to approximately 50-70%. In this example, the magnetic signal strength of coated samples was measured to be approximately ~100% of the standard MICR waveform, which is better than a blank check with no fuser oil. This high magnetic signal strength would lead to a reader reject rate for the document of no more than about 0.5%. As shown In FIGS. 4A and 4B, which are 150× and 1500× magnifications of the Xerox check stock having a wax coating thereon, the wax integrated into the paper surface and appeared to fill in the space voids between paper fibers with waxy material. While not intending to be bound by theory, it appears that because the wax material cracked after it was fully dried, resulting in a plurality of elongated, thin cracks having a length of 100-300 microns and a width of 2-4 microns, possibly eliminating the —OH binding, fuser oil was able to seep through the cracks in the wax. The absorption of fuser oil into the cracks away from the surface may have assisted in the bonding of the MICR ink applied using a MTTR. The compatibility of the wax in the coating with the wax in the MICR ink may have overcome the negative effects of the fuser oil.

PROPHETIC EXAMPLE 2

Xerox check stock 4024 DP, 24# (green perforated letter check stock) is spray coated using an air atomized spray having the formulation shown below.

Formulation 2: 31.9 wt % diethylene glycol (Sigma-Aldrich)
  67.6 wt % polyethylene wax (Joncryl Wax 26)
  0.5 wt % fluorescent tag dye (IFWB-14, Risk Reactor, Huntington Beach, Calif.)

The diethylene glycol is a humectant added to prevent clogging of the spray device. The formulation was aqueous based and has 17.6 wt % solids. The fluid pressure of application is about 7 psi and the air pressure is about 15 psi. A first set of documents is sprayed with a direct spray, a second set is sprayed at a pulsed 40 duty cycle, and a third set is sprayed at a pulsed 60 duty cycle.

After coating and drying, the check stock is run through an iGen3 fusing subsystem to coat the paper with a representative amount of oil, about 11 microliters of oil per copy. After coating and drying, MICR encoding takes place using a magnetic thermal transfer ribbon which places the toner on the dried wax emulsion. The magnetic signal strength of the encoded data is measured and is found to be over 80%.

The printing systems and methods described herein can be used for coating checks and other individually identifiable documents to be used in many applications including electrophotographic, ionographic or magnetographic printing, especially MICR and related processes, including digital systems. The details of printers, printing engines, etc. are well-known by those ordinarily skilled in the art and are discussed in, for example, U.S. Pat. No. 6,032,004, the complete disclosure of which is fully incorporated herein by reference. The embodiments herein can encompass embodiments that print in color, monochrome, or handle color or monochrome image data.

It will be appreciated that the above-disclosed and other features and functions, or alternatives thereof, may be desirably combined into many other different systems or applications. Various presently unforeseen or unanticipated alternatives, modifications, variations, or improvements therein may be subsequently made by those skilled in the art, which are also intended to be encompassed by the following claims. Unless specifically defined in a specific claim itself, steps or components of the invention should not be implied or imported from any above example as limitations to any particular order, number, position, size, shape, angle, color, or material.

What is claimed is:

1. A substrate comprising a first surface having fuser oil thereon, a portion of the first surface including a fuser oil mitigating wax coating having a plurality of cracks therein having a length of 100-300 microns and a width of 2-4 microns through which a portion of the fuser oil is absorbed, and a magnetic ink image having a magnetic signal strength of at least 80% formed over the wax coating.

2. The substrate of claim 1, wherein the wax coating comprises a polyolefin.

3. The substrate of claim 1, wherein the wax coating comprises a polyethylene.

4. The substrate of claim 1, wherein the substrate is check paper.

5. The substrate of claim 1, wherein the fuser oil contains amino functional groups and the coating comprises a polyethylene having —OH bonding sites configured to bond with amino functional groups of the fuser oil.

6. The substrate of claim 1, wherein the magnetic ink image has a magnetic signal strength of at least 95%.

7. The substrate of claim 1, wherein the substrate is laminated.

8. The substrate of claim 1, wherein the substrate is bound.

9. The substrate of claim 1, further comprising an image formed from a non-MICR toner formed thereon.

10. The substrate of claim 3, wherein the polyethylene wax coating has a melting point of from about 100 to about 150 degrees C.

11. The substrate of claim 1, wherein the wax coating has a surface tension from about 10 to about 50 mN/meter.

12. The substrate of claim 1, wherein the coating includes at least one additive.

13. The substrate of claim 12, wherein the additive is at least one of a surfactant and a fluorescent tag.

14. The substrate of claim 1, wherein the coating includes a UV fluorescing tag.

15. The substrate of claim 12, wherein the coating is formed from a coating composition containing at least one of a surfactant, a fluorescent tag, a viscosity modifier and a thickener.

* * * * *